US010320599B2

(12) United States Patent
Wild et al.

(10) Patent No.: US 10,320,599 B2
(45) Date of Patent: Jun. 11, 2019

(54) METHOD OF AND APPARATUS FOR PROVIDING A MULTI-CARRIER MODULATED SIGNAL

(71) Applicant: Alcatel Lucent, Boulogne Billancourt (FR)

(72) Inventors: Thorsten Wild, Stuttgart (DE); Frank Schaich, Stuttgart (DE)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 15/512,962

(22) PCT Filed: Aug. 18, 2015

(86) PCT No.: PCT/EP2015/068900
§ 371 (c)(1),
(2) Date: Mar. 21, 2017

(87) PCT Pub. No.: WO2016/045875
PCT Pub. Date: Mar. 31, 2016

(65) Prior Publication Data
US 2017/0237596 A1    Aug. 17, 2017

(30) Foreign Application Priority Data

Sep. 25, 2014  (EP) ..................... 14290288

(51) Int. Cl.
*H04L 27/36*  (2006.01)
*H04L 27/26*  (2006.01)

(52) U.S. Cl.
CPC ........ *H04L 27/2644* (2013.01); *H04L 27/264* (2013.01); *H04L 27/2636* (2013.01)

(58) Field of Classification Search
CPC ........... H04L 25/03343; H04L 25/4921; H04L 2025/03414; H04L 27/2636;
(Continued)

(56) References Cited

U.S. PATENT DOCUMENTS 6,597,745 B1 * 7/2003 Dowling ........... H04L 25/03343
375/240.18
6,657,950 B1    12/2003 Jones et al.
(Continued)

FOREIGN PATENT DOCUMENTS

WO    WO 2014/085710 A1    6/2014

OTHER PUBLICATIONS

Vida Vakilian et al., "Universal-Filtered Multi-Carrier Technique for Wireless Systems Beyond LTS," Globecom 2013 Workshop—Broadcast Wireless Access, IEEE, pp. 223-228, XP032599957, 2013.
(Continued)

Primary Examiner — Don N Vo
(74) Attorney, Agent, or Firm — Fay Sharpe LLP

(57) ABSTRACT

A method of providing a multi-carrier modulated signal (mcs), which has at least one sub-band (sb1) having a plurality of subcarriers (sc), includes the following: receiving (200) an input signal vector (s), wherein each component of the input signal vector is associated with one of the plurality of subcarriers, expanding (210) the input signal vector by adding one or more additional vector elements in front of and/or after the components of the input signal vector to obtain an expanded signal vector ($s_{ext}$), upsampling (220) the expanded signal vector to obtain an upsampled signal vector ($s_{up}$), and filtering (230) the upsampled signal vector to obtain a filtered sub-band output signal ($X_{filt}$).

17 Claims, 4 Drawing Sheets

(58) Field of Classification Search
CPC ............ H04L 27/2675; H04L 27/2644; H04L 27/264; H04L 5/023; H04W 72/04
USPC ........................................................ 375/298
See application file for complete search history.

(56) References Cited

U.S. PATENT DOCUMENTS

| | | | |
|---|---|---|---|
| 7,627,056 B1* | 12/2009 | Harris ................... | H04L 1/004 375/260 |
| 2008/0031376 A1 | 2/2008 | Ban | |
| 2008/0310296 A1* | 12/2008 | Mahadevan ........ | H04L 27/2618 370/210 |
| 2016/0198446 A1 | 7/2016 | Wild et al. | |
| 2017/0264476 A1* | 9/2017 | Yang ..................... | H04L 5/0066 |

OTHER PUBLICATIONS

Frank Schaich et al., " Waveform contenders for 5G—OFDM vs. FBMC vs. UFMC," 2014 6$^{th}$ International Symposium on Communications, Control and Signal Processing, IEEE, pp. 457-460, XP032627152, 2014.

Jeffrey G. Andrews et al., "What Will 5G Be?," IEEE Journal on Selected Areas in Communications, vol. 32, No. 6, pp. 1065-1082, XP011554180, Jun. 2014.

Thorsten Wild et al., "A Reduced Complexity Transmitter for UF-OFDM," Bell Labs, Alcatel-Lucent, Germany, pp. 1-5, May 2015.

International Search Report for PCT/EP2015/068900 dated Nov. 3, 2015.

Zhang et al., DFT Spread Generalized Multi-Carrier Scheme for Broadband Mobile Communications, The 17th Annual IEEE International Symposium on Personal, Indoor and Mobile Radio Communications, Sep. 11-14, 2006; 5 pp.

PCT Pat. App. PCT/EP2015/068900, Written Opinion of the International Searching Authority, dated Nov. 3, 2015, 6 pp.

European Patent App. No. 14290288, Corrected European Search Opinion, dated Apr. 15, 2015, 4 pp.

European Patent App. No. 14290288, Extended European Search Report, dated Mar. 26, 2015, 7 pp.

\* cited by examiner

METHOD OF AND APPARATUS FOR PROVIDING A MULTI-CARRIER MODULATED SIGNAL

FIELD OF THE INVENTION

The invention relates to a method of providing a multi-carrier modulated signal which comprises at least one sub-band, wherein said sub-band comprises a plurality of sub-carriers, wherein an input signal vector is received, and wherein each component of said input signal vector is associated with one of said plurality of subcarriers.

The invention also relates to an apparatus for providing a multi-carrier modulated signal.

BACKGROUND

Multi-carrier modulated signals are widely used in telecommunications. Today's dominating wireless physical layer waveform is cyclic-prefix (CP-) orthogonal frequency division multiplexing (OFDM). It is used in fourth generation (4G) cellular systems like LTE(-A), as well as in IEEE 802.11 standards. A drawback of CP-OFDM is its spectral property of high side lobe levels. As a consequence, CP-OFDM has to be operated in strict time-frequency alignment in order to avoid inter-carrier interference.

Schaich, F.; Wild, T.; Chen, Y.; "Waveform contenders for 5G—suitability for short packet and low latency transmissions," in proceedings of IEEE Veh. Technol. Conf. Spring (VTC'14 Spring), May 2014, ([reference 1]) discloses three candidate multicarrier waveforms for the air interface of fifth generation (5G) networks. According to this publication, Universal Filtered Multi-Carrier (UFMC), which is also denoted as Universal Filtered Orthogonal Frequency Division Multiplexing, UF-OFDM, seems to be a promising 5G waveform candidate.

FIG. 1 depicts a block diagram of a conventional transmitter chain 1000 for UF-OFDM in an uplink (UL) configuration. B many UF-OFDM sub-modules 1010_1, 1010_2, ..., 1010_B are provided, each of which receives e.g. QAM (quadrature amplitude modulation)—modulated symbols $s_{1k}, \ldots, s_n$, wherein the index k represents a specific user, and each of which outputs a respective time domain transmit vector $x_{1k}, x_{2k}, \ldots, x_{Bk}$ obtained depending on said QAM-modulated symbols in a manner explained in detail below. The so obtained B many time domain transmit vectors $x_{1k}, \ldots, x_{Bk}$ are superposed (i.e., added) by adder 1020, and the sum signal $x_k$ obtained at an output of the adder 1020 is up-converted, e.g. to a radio frequency (RF) range, by means of up-conversion unit 1030, whereby a UF-OFDM modulated RF signal rfo is obtained. Optionally, said up-conversion unit 1030 may also perform further well-known RF processing such as filtering, amplification, and the like.

A detector (not shown) may receive the UF-OFDM modulated RF signal rfo which may also comprise noise and/or interference caused by the RF channel/other users/transmitters in a per se known manner. After conversion to a baseband frequency range, the received signal vector may be processed as known in the art to improve the received signal quality.

Referring back to FIG. 1, according to the conventional UF-OFDM technique described in the above mentioned paper of Schaich et al., the time domain transmit vector $x_k$ for a particular multicarrier symbol of a user "k" is obtained as the superposition (cf. adder 1020) of sub-band-wise filtered components, with filter length L and FFT (Fast Fourier Transform) length N:

$$x_k = \sum_{i=1}^{B} F_{ik} V_{ik} s_{ik} \quad \text{(equation 1)},$$

wherein $x_k$ is a [(N+L−1)×1] vector, i.e. a column vector having (N+L−1) many rows, wherein $F_{ik}$ is a [(N+L−1)×N] matrix, wherein $V_{ik}$ is a [N×$n_i$] matrix, and wherein $s_{ik}$ is a [$n_i$×1] vector. For the sake of simplicity, a time index "m" is not considered in equation 1.

For each of the B many sub-bands, indexed i, $n_i$ many complex QAM symbols—gathered in $s_{ik}$—are transformed to time domain by an IDFT-matrix $V_{ik}$. This is exemplarily depicted for the first sub-band (i=1) by IDFT spreader unit 1012_1. The IDFT-matrix $V_{ik}$ includes the relevant columns of an inverse Fourier matrix according to the respective sub-band position (index "i") within the overall available frequency range. The matrix $F_{ik}$ is a Toeplitz matrix, composed of a filter impulse response of a filter performing the linear convolution for filtering the time domain signals obtained by the IDFT-matrix $V_{ik}$, wherein said filter functionality implementing said matrix $F_{ik}$, or matrix $F_{ik}$, for the first sub-band (i=1), respectively, is represented by said filter unit 1014_1.

In other words, UF-OFDM sub-module 1010_1 comprises the IDFT spreader unit 1012_1 and the filter unit 1014_1. The further UF-OFDM sub-modules 1010_2, ..., 1010_B comprise a similar structure with a respective IDFT spreader unit (implementing IDFT-matrix $V_{ik}$) and a respective filter unit (implementing matrix $F_{ik}$), wherein—as stated above—IDFT-matrix $V_{ik}$ includes the relevant columns of an inverse Fourier matrix according to the respective sub-band position "i" within the overall available frequency range, and wherein matrix $F_{ik}$ comprises a suitable filter impulse response for each sub-band i.

By now, no efficient solution for an apparatus and a method capable of providing multicarrier modulated signals of UF-OFDM type, has been provided.

SUMMARY

It is an object of the present invention to provide an improved method of providing multicarrier modulated signals, especially of the UF-OFDM type.

It is a further object of the present invention to provide an improved apparatus for providing such multicarrier modulated signals.

Regarding the abovementioned method, said object is achieved by expanding said input signal vector by adding one or more additional vector elements in front of and/or after the components of said input signal vector, whereby an expanded signal vector is obtained, upsampling the expanded signal vector, whereby an upsampled signal vector is obtained, filtering the upsampled signal vector to obtain a filtered sub-band output signal. I.e., according to an embodiment, said step of expanding said input signal vector increases the total number of vector elements in one dimension by appending and/or prepending a corresponding number of new vector elements to the existing vector elements of said input signal vector.

According to Applicant's analysis the principle according to the embodiments advantageously enables to cut the signal to be processed for generating the multi-carrier modulated signal to some extent in frequency and/or time domain to finally provide a low complex frequency domain signal approximation. It turned out that a resulting approximation error can be reduced to a tolerable amount, e.g. much smaller than any distortions caused by a subsequent RF chain processing and digital pre-processing.

As a further advantage, the obtained approximation error is flexibly adjustable when employing the principle according to the embodiments, with different trade-offs for complexity and accuracy, because various tuning parameters may be introduced affecting different processing stages of the method according to the embodiments.

According to an embodiment, the step of receiving may comprise receiving said input signal vector from a preceding stage, which may be external to an apparatus performing the method according to the embodiments, such as e.g. an external QAM modulator. However, according to further embodiments, said step of receiving said input signal vector may also comprise obtaining or determining the input signal vector, for example locally to the apparatus performing the method according to the embodiments. In these variants, e.g., a QAM modulator or some other modulator or generally speaking a source of said input signal vector may be integrated into the apparatus performing the method according to the embodiments.

According to an embodiment, said step of expanding said input signal vector s may be performed in accordance with the following equation:

$$s_{ext} = [(\vec{0}_{[1 \times K_F]}, s^T, \vec{0}_{[1 \times K_F]}]^T \quad \text{(equation 2)},$$

wherein $\vec{0}_{[1 \times K_F]}$ is a Null vector with $K_F$ many elements, wherein $[\ ]^T$ denotes a vector transpose, and wherein $s_{ext}$ is the resulting expanded signal vector.

For example, suppose input signal vector s comprises twelve elements $s_1, \ldots, s_{12}$, each of which is associated with a frequency subcarrier to be modulated, and $K_F=10$, this yields $s_{ext}=[0,0,0,0,0,0,0,0,0,0,s_1,s_2,s_3,s_4,s_5,s_6,s_7,s_8,s_9,s_{10},s_{11},s_{12}, 0,0,0,0,0,0,0,0,0,0]^T$ for the expanded input signal vector $s_{ext}$ in accordance with equation 2.

According to a further embodiment, the expansion is not required to be symmetric, i.e. different numbers of newly added vector elements in front of and/or after $s^T$ are possible. According to a further embodiment, at least one vector element added for said expansion step may also comprise nonzero values.

According to a particularly preferred embodiment, said step of upsampling comprises: applying an inverse discrete Fourier transform, iDFT, particularly using an inverse fast Fourier transform, iFFT, to said expanded signal vector $s_{ext}$, whereby a first time domain vector $x_{short}$ is obtained, expanding said first time domain vector $x_{short}$ by adding one or more additional vector elements, preferably in front of and/or after the components of said first time domain vector $x_{short}$, whereby a second time domain vector $x_{ext}$ is obtained, applying a discrete Fourier transform, DFT, particularly using a fast Fourier transform, FFT, to said second time domain vector $x_{ext}$, whereby said upsampled signal vector $s_{up}$ is obtained, which enables an efficient upsampling and offers further degrees of freedom for approximation measures reducing the overall complexity of the method according to the embodiments.

According to a further embodiment, for said step of applying said DFT to said second time domain vector, $N_{FFTu}$ many points are used, wherein $N_{FFTu}$ is chosen to be smaller than a system bandwidth sb, wherein said system bandwidth sb is defined in accordance with the equation $sb=Bmax \cdot n_i$, wherein Bmax is the number of sub-bands of said multi-carrier modulated signal, and wherein $n_i$ is the number of subcarriers per sub-band. For example, if a system with $n_i=12$ subcarriers per sub-band is considered (e.g., similar to conventional LTE systems with 12 subcarriers per resource block), which comprises Bmax=50 sub-bands, said system bandwidth—in terms of subcarriers—yields sb=600. Advantageously, according to an embodiment, the parameter $N_{FFTU}$ is chosen to be smaller than said system bandwidth, whereby reduced complexity for the signal processing, particularly for the upsampling and filtering steps, is obtained.

According to a further embodiment, a next larger power of 2 may be employed for the value of the system bandwidth sb, for example according to the following equation:

$$sb' = 2^{(\lceil ld(sb) \rceil)},$$

wherein sb' is a modified system bandwidth forming a power of 2, wherein ld(x) is the binary logarithm ("logarithmus dualis") of a number x, and wherein $\lceil \bullet \rceil$ is a ceiling operator. In this embodiment, the parameter $N_{FFTu}$ may correspondingly be chosen to be smaller than the modified system bandwidth sb'. For example, for a system with $n_i=12$ subcarriers per sub-band which comprises Bmax=50 sub-bands, the modified system bandwidth sb' is obtained as $$sb' = 2^{(\lceil ld(Bmax \cdot ni) \rceil)} = 1024.$$

According to a further embodiment, for said step of applying said iDFT to said expanded signal vector $s_{ext}$, $N_{IFFTo}$ many points are used, wherein $N_{IFFTo}$ is chosen to be greater or equal than 16, preferably greater or equal than 64, wherein the latter value yields negligible approximation errors for providing the UF-OFDM signal as compared to the conventional process of FIG. 1, based on an exemplarily assumed value of $n_i=12$ subcarriers sc (FIG. 2) per sub-band. According to a further embodiment, $N_{IFFTo}$ is chosen to be smaller than 1024, preferably smaller than 256, to provide efficiency and performance gains with respect to the conventional solutions.

According to a further embodiment, the value $K_F$ for the step of expanding said input signal vector s in accordance with equation 2 may be chosen depending on the following equation:

$$K_F = (N_{IFFTo} - n_i)/2 \quad \text{(equation 3)},$$

whereby it is ensured that the expanded input signal vector $s_{ext}$ optimally fits the iDFT process applied to it during the upsampling process according to the abovementioned embodiment. Note that $n_i$ represents the number of vector elements of input signal vector s.

For example, suppose $N_{IFFTo}=64$ and $n_i=12$, then, according to the preceding embodiment, $K_F$ may be set to 26.

According to a further embodiment, for values of $n_i$ larger than 12, larger values for $N_{IFFTo}$ may be chosen. According to an embodiment, in this situation, the parameter $N_{IFFTo}$ may be obtained according to the following equation:

$$N_{IFFTo} = 2 \cdot K_F + n_i \quad \text{(equation 3a)},$$

wherein $K_F=26$ may be used.

According to the preceding embodiment, by applying said iDFT, particularly iFFT, to said expanded signal vector $s_{ext}$, a first time domain vector $x_{short}$ is obtained, which may also be termed a "short-length" time domain representation of said expanded signal vector $s_{ext}$ due to its reduced length (as compared with the prior art iDFT of block 1012_1 of FIG. 1, which usually uses 1024 points and more) and the approximation approach according to the embodiments.

According to an example, the first time domain vector $x_{short}$ may be obtained in accordance with the following equation:

$$x_{short} = \text{IFFT}\{s_{ext}\} \quad \text{(equation 4)},$$

wherein IFFT{ } denotes the aforementioned iFFT with $N_{IFFTo}$ many points.

According to an embodiment, said step of expanding said first time domain vector $x_{short}$ may be performed in accordance with the following equation:

$$x_{ext} = [x_{short}, \vec{0}_{[1 \times K_T]}]^T \quad \text{(equation 5)},$$

wherein $\vec{0}_{[1 \times K_T]}$ is a Null vector with $K_T$ many elements, wherein $[\ ]^T$ denotes a vector transpose, and wherein $x_{ext}$ is the resulting second time domain vector. The parameter $K_T$ represents a further degree of freedom for optimizing the method according to the embodiments regarding precision/approximation errors and efficiency.

According to a further embodiment, in analogy to equation 2, different numbers of newly added vector elements in front of and/or after $x_{short}$ in equation 5 are possible.

According to a further embodiment, at least one vector element added for said expansion step may also comprise nonzero values.

According to a further embodiment, for said step of applying said DFT, particularly, FFT, to said second time domain vector $x_{ext}$, an $N_{FFTu}$-point-FFT (i.e., an FFT with $N_{FFTu}$ many points), may be used:

$$N_{FFTu} = N_{OS} \cdot N_{IFFTo} \quad \text{(equation 6)},$$

wherein $N_{OS}$ is an oversampling factor determining the degree of upsampling.

Advantageously, when considering an above explained embodiment according to which the parameter $N_{FFTu}$ is chosen to be smaller than the system bandwidth sb, the parameter $N_{IFFTo}$ may be derived from said parameter $N_{FFTu}$ and a suitable oversampling factor $N_{OS}$ in accordance with equation 6. Thus, according to a further preferred embodiment, the parameter $N_{IFFTo}$ is chosen to be smaller than the parameter $N_{FFTu}$.

According to a further embodiment, preferred values for $N_{OS}$ range from about 1.2 to about 4, wherein $N_{OS}=2$ was large enough to obtain negligible approximation errors for generation of an UF-OFDM signal.

According to a further embodiment, a preferred value for the parameter $K_T$ is to set it as $K_T = N_{IFFTo}$ for $N_{OS}=2$. According to an embodiment, $K_T$ is determined depending on $N_{IFFTo}$ and $N_{OS}$ by the equation $K_T = N_{IFFTo}(N_{OS}-1)$, thus appending as many zeros as are required for achieving an FFT input length $N_{FFTu}$.

According to a further embodiment, said step of filtering comprises filtering the upsampled signal vector in the frequency domain, preferably by evaluating the Hadamard product of said upsampled signal vector and a filtering vector, which enables an efficient calculation of the filtering and at the same time offers further degrees of freedom regarding reduction of the data to be processed, e.g. by only considering parts of a respective representation of the filter in the frequency domain.

According to a further embodiment, a plurality of input signal vectors is received, wherein each of the input signal vectors is associated with a sub-band, and wherein said steps of expanding, upsampling and filtering are performed for each of said input signal vectors or its associated sub-band respectively.

Thus, different frequency sub-bands may be processed according the principle of the embodiment so that a particularly efficient processing of multiple frequency sub-bands, which may also be fragmented, i.e. non-contiguous, according to an embodiment, is also possible.

According to a further embodiment, filtered sub-band output signals of different sub-bands, preferably of all sub-bands, are combined with each other, whereby an aggregated multi-carrier modulated signal of the UF-OFDM type is obtained.

According to a further embodiment, for all sub-bands of said multi-carrier modulated signal, a respective filtered sub-band output signal $x_{filt}$ is placed at a respective frequency position in a frequency domain result vector $X_{total}$, the respective frequency position corresponding to a specific sub-band, wherein preferably said frequency domain result vector $X_{total}$ is obtained in accordance with the equations $X_{total} = \sum_{i=1}^{B} X_{full}^{(i)}$, wherein B represents the number of sub-bands of said multi-carrier modulated signal, and wherein $X_{full}^{(i)} = [\vec{0}_{[1 \times K_{offs}]}, X_{filt}^T, \vec{0}_{[1 \times (N_{OS} \cdot K_{offs} - N_{FFTu})]}]^T$ is a frequency domain contribution of the i-th filtered sub-band output signal $x_{filt}$, wherein N is a parameter having a value greater or equal than a system bandwidth $sb = B \cdot n_i$, and wherein $n_i$ is the number of subcarriers per sub-band, wherein $K_{offs}$ denotes said frequency position of said respective filtered sub-band output signal in said frequency domain result vector $X_{total}$.

According to a further embodiment, a time domain result vector $x_{total}$ is obtained by applying an inverse DFT, preferably an iFFT, to said frequency domain result vector $X_{total}$, preferably in accordance with the equation $x_{total} = \sqrt{N} \cdot \text{IFFT}\{X_{total}\}$.

According to a further embodiment, said time domain result vector $x_{total}$ is reduced to its first t many vector elements, wherein preferably $t = N+L-1$.

A further solution to the object of the present invention is provided by an apparatus according to claim 12. According to further embodiments, the apparatus may be configured to perform any of the methods according to the embodiments.

The apparatus according to the embodiments may e.g. be provided in a terminal such as e.g. a terminal for a cellular communications network. Alternatively or in addition, the apparatus according to the embodiments may e.g. be provided in a base station for a cellular communications network. Peer-to-peer communication devices may also advantageously be equipped with an apparatus according to the embodiments.

BRIEF DESCRIPTION OF THE FIGURES

Further features, aspects and advantages of the present invention are given in the following detailed description with reference to the drawings in which.

DESCRIPTION OF THE EMBODIMENTS

Figure 1:
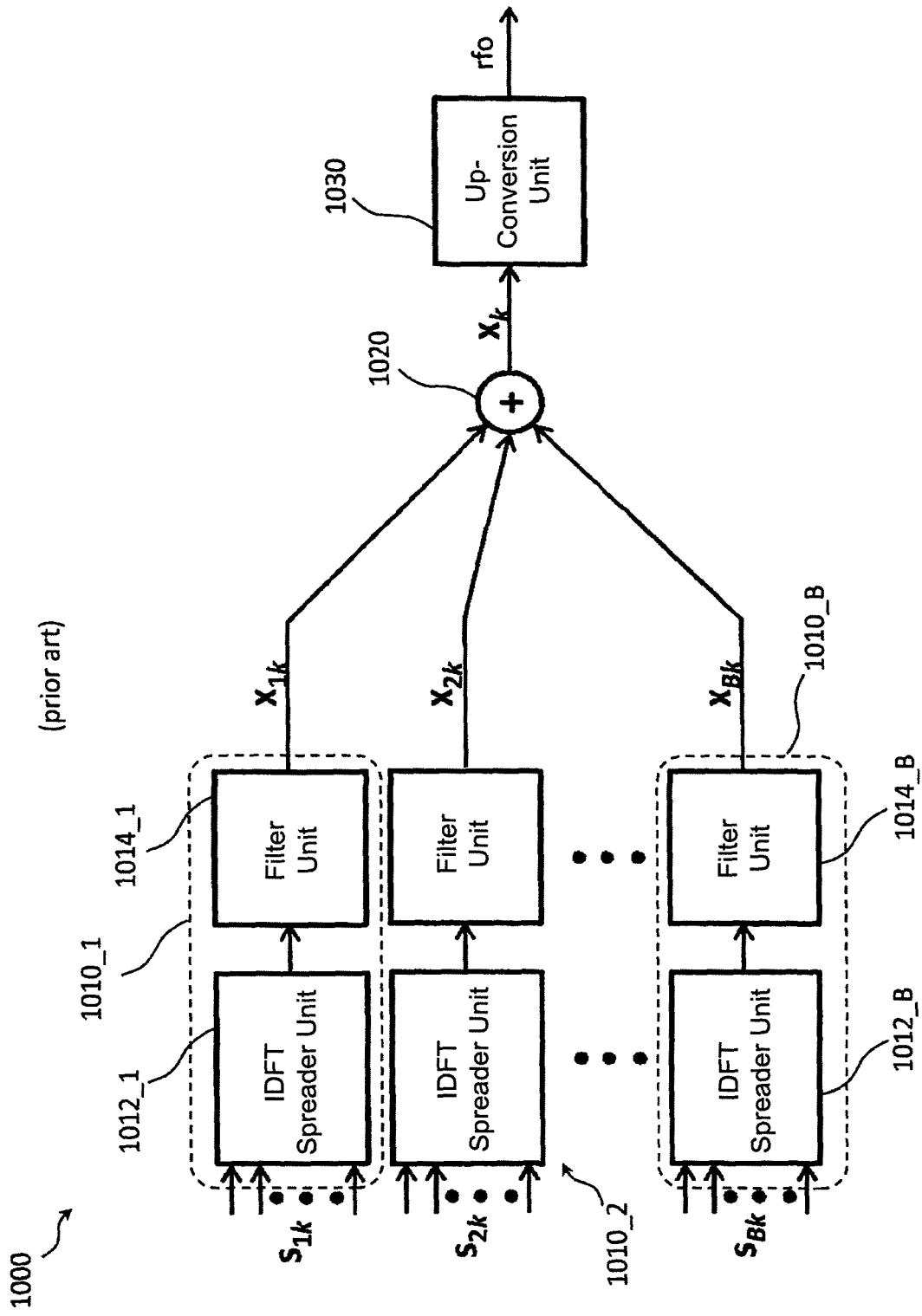
FIG. 1 schematically depicts a block diagram of a conventional UF-OFDM transmitter, FIG. 2 schematically depicts a relative power in decibel over a frequency spacing in subcarrier steps of a multi-carrier modulated signal obtained according to the embodiments, FIG. 3 schematically depicts a simplified flowchart of a method according to an embodiment, FIG. 4 schematically depicts a simplified flowchart of a method according to a further embodiment, FIG. 5 schematically depicts a simplified block diagram of an apparatus according to an embodiment, and FIG. 6 schematically depicts a block diagram of an apparatus according to a further embodiment.

FIG. 1 schematically depicts a block diagram of a conventional UF-OFDM transmitter 1000 which has been explained in detail above and which disadvantageously exhibits comparatively high complexity due to the IDFT spreader units 1012_1, . . . and the convolutional filter units 1014_1, . . . .

Figure 2:
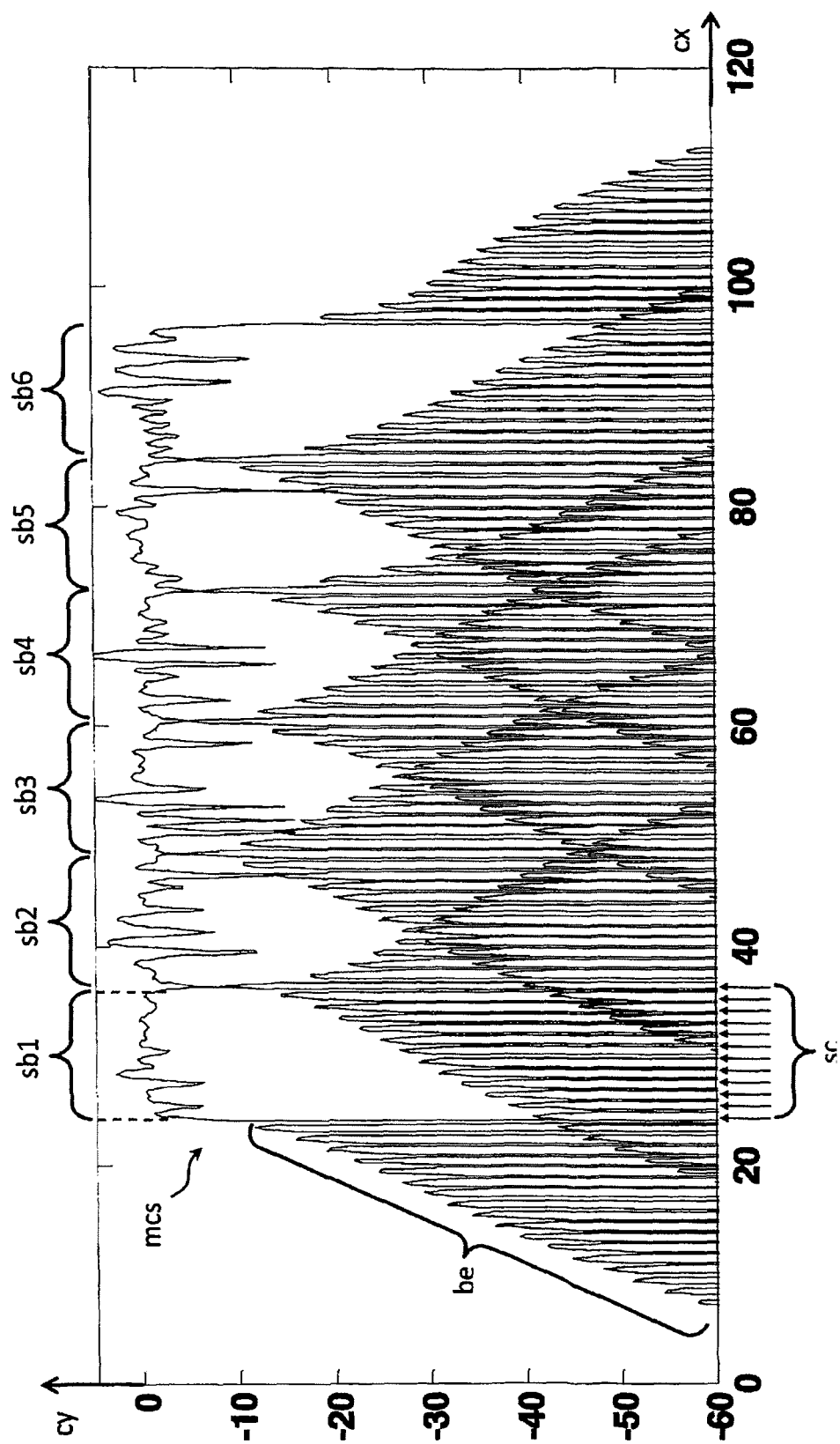

FIG. 2 schematically depicts an exemplary multi-carrier modulated signal mcs of the UF-OFDM type which can be obtained by using the conventional UF-OFDM transmitter 1000 of FIG. 1 and which may also be obtained—at least approximately—by an apparatus and method according to the present embodiments as explained in detail below. More specifically, in FIG. 2, a horizontal axis cx represents a frequency spacing in units of sub-carrier steps of the multi-carrier modulated signal mcs, and a vertical axis cy represents a relative power in decibel (dB).

As can be seen from FIG. 2, the multi-carrier modulated signal mcs comprises six sub-bands sb1, sb2, . . . , sb6, wherein each sub-band comprises an exemplary number of twelve sub-carriers sc. The sub-carriers sc are indicated for the first sub-band sb1 only for the reasons of clarity.

Figure 3:
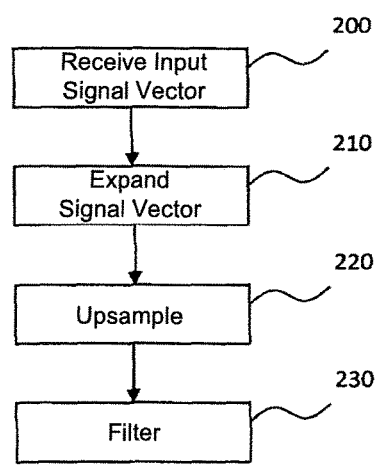

As can also be seen from FIG. 2, the individual sub-band signals, cf. e.g. sub-band sb1, comprise a particularly advantageous side lobe behavior (cf. the lower band edge be of the first sub-band's signal portion) in that the respective side lobes of the spectrum comprise a steep slope—as compared to conventional OFDM signals, also cf. FIG. 3 of [reference 1] mentioned above.

The principle according to the embodiments advantageously enables to obtain a multi-carrier modulated signal such as the exemplary signal mcs depicted by FIG. 2 with a comparatively small approximation error, and with significantly decreased complexity as compared to the conventional system 1000 of FIG. 1.

FIG. 3 schematically depicts a simplified flowchart of a method according to an embodiment. In step 200, an input signal vector s is received, wherein each component of said input signal vector s is associated with one of said plurality of sub-carriers of the multi-carrier modulated signal to be generated. In terms of FIG. 2, for example, the vector elements of the input signal vector s may e.g. be employed for respectively modulating the sub-carriers sc of e.g. the first sub-band sb1. In so far, the input signal vector s may also be considered as representing (complex) amplitudes of the respective sub-carriers sc of a considered sub-band. For example, if one sub-band sb1 comprises twelve subcarriers sc, a corresponding input signal vector s having twelve vector elements may be used.

In a subsequent step 210 (FIG. 3), said input signal vector s is expanded by adding one or more additional vector elements in front of and/or after the components of the input signal vector, whereby an expanded signal vector $s_{ext}$ is obtained, also cf. equation 2 above. After that, in step 220, the expanded signal vector $s_{ext}$ is upsampled, whereby an upsampled signal vector $s_{up}$ is obtained. A so obtained upsampled signal vector $s_{up}$ is subsequently filtered in step 230, whereby a filtered sub-band output signal is obtained.

The afore-explained method according to the embodiments advantageously enables to avoid the rather complex evaluation of the IDFT blocks 1012_1 and the time-domain convolutional filtering blocks 1014_1 of the conventional architecture 1000 of FIG. 1.

Rather, by proposing the steps of expanding 210, upsampling 220 and filtering 230, various degrees of freedom can be introduced, which at the same time represent optimization and approximation parameters that enable to process the input signal vector s with reduced complexity as compared to the prior art while at the same time keeping the approximation error comparatively small.

Figure 4:
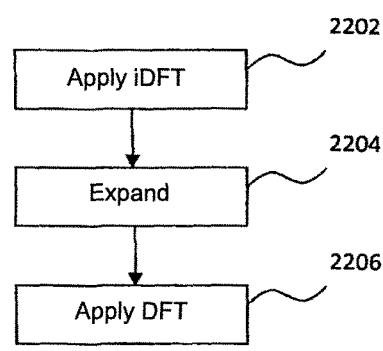

According to a particularly preferred embodiment, a corresponding flowchart of which is provided in FIG. 4, the step of upsampling 220 (FIG. 3) comprises: applying 2202 (FIG. 4) an inverse discrete Fourier transform, iDFT, particularly using an inverse fast Fourier transform, iFFT, to said expanded signal vector, whereby a first time-domain vector is obtained, expanding 2204 said first time domain vector by adding one or more additional vector elements, preferably in front of and/or after the components of said first time domain vector, whereby a second time domain vector is obtained, and applying 2206 a discrete Fourier transform, DFT, particularly using a fast Fourier transform, FFT, to said second time domain vector, whereby said upsampled signal vector is obtained.

According to a further embodiment, for said step of applying 2202 said iDFT to said expanded signal vector $s_{ext}$, $N_{IFFTo}$ many points are used, wherein $N_{IFFTo}$ is chosen to be greater or equal than 16, preferably greater or equal than 64, wherein the latter value yields negligible approximation errors for providing the UF-OFDM signal as compared to the conventional process of FIG. 1, based on an exemplarily assumed value of $n_i$=12 subcarriers sc (FIG. 2) per sub-band. According to a further embodiment, $N_{IFFTo}$ is chosen to be smaller than 1024, preferably smaller than 256, to provide efficiency and performance gains with respect to the conventional solutions.

According to a further embodiment, for said step of applying 2206 said DFT, particularly, FFT, to said second time domain vector $x_{ext}$, an $N_{FFTu}$-point-FFT (i.e., an FFT with $N_{FFTu}$ many points), may be used:

$$N_{FFTu} = N_{OS} \cdot N_{IFFTo} \qquad \text{(equation 6)},$$

wherein $N_{OS}$ is an oversampling factor determining the degree of upsampling.

According to a further embodiment, preferred values for $N_{OS}$ range from about 1.2 to about 4, wherein $N_{OS}$=2 is large enough to obtain negligible approximation errors for generation of an UF-OFDM signal.

Figure 5:
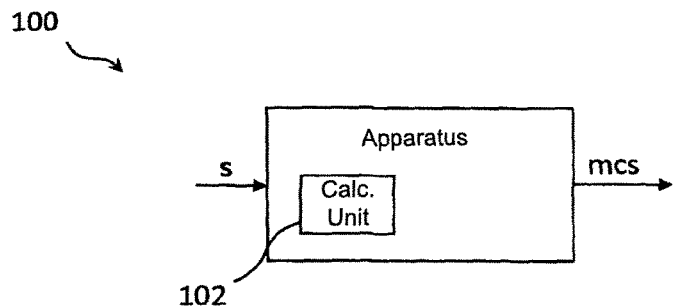

FIG. 5 schematically depicts an apparatus 100 according to the embodiments. The apparatus 100 may e.g. comprise a calculating unit 102 which is capable of performing the steps of the afore-explained method according to the embodiments. For example, the calculating unit 102 may comprise one or more micro-processors and/or digital signal processors (DSP) and/or ASICs (application specific integrated circuits) and/or FPGAs (field programmable gate array) or a combination thereof. At an input, the apparatus 100 receives at least one input signal vector s, and the apparatus 100 performs the method according to an embodiment on this input signal vector s, whereby a multi-carrier modulated signal mcs, e.g. of the exemplarily depicted shape of FIG. 2, is obtained.

The apparatus 100 according the embodiments is particularly well-suited for generating multi-carrier modulated signals mcs conforming to the UF-OFDM signal type.

Figure 6:
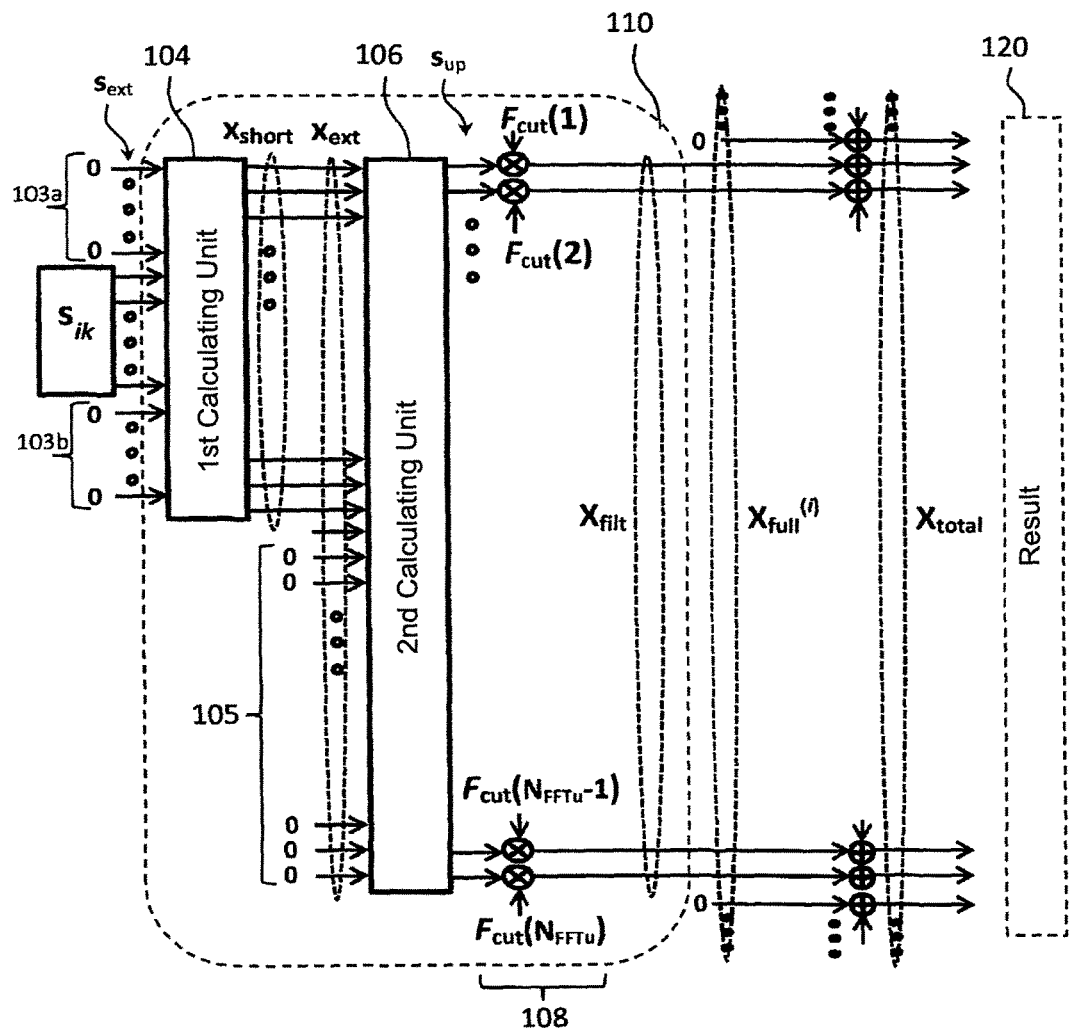

FIG. 6 schematically depicts a further aspect of the principle according to the embodiments, which may e.g. be implemented in the apparatus 100 according to an embodiment.

On the left side of FIG. 6, an input signal vector $s_{ik}$ is provided, where index "i" represents one of several sub-bands for which the multi-carrier modulation can be carried out according to an embodiment. Presently, for the sake of simplicity, only one single sub-band, e.g. the first sub-band sb1 of FIG. 2, is considered. However, according to further embodiments, further sub-bands sb2, sb3, . . . may be processed as explained above with reference to FIGS. 3, 4 so that a particularly efficient processing of multiple frequency sub-bands, which may also be fragmented, i.e. non-contiguous, is also possible.

The further index "k" denotes a user which may be associated with the apparatus 100 (FIG. 5) according to the embodiments. However, for the further explanation, also the second index k is not required to be considered in detail.

For the present example, the input signal vector $s_{ik}$ comprises $n_i=12$ vector elements, each of which is associated with a sub-carrier sc to be modulated thereby. According to the principle of the embodiments, after receiving 200 (FIG. 3) the input signal vector $s_{ik}$, said input signal vector $s_{ik}$ is expanded (cf. step 210 of FIG. 3), which is represented by the brackets 103a, 103b in FIG. 6. The step 210 of expanding may e.g. be carried out in accordance with the equation $$s_{ext} = [\vec{0}_{[1 \times K_F]}, s_{ik}^T, \vec{0}_{[1 \times K_F]}]^T \qquad \text{(equation 2a)},$$

wherein $\vec{0}_{[1 \times K_F]}$ is a Null vector with $K_F$ many elements (the parameter $K_F$ may e.g. be chosen in accordance with equation 3), wherein $[\ ]^T$ denotes a vector transpose, and wherein $s_{ext}$ is the resulting expanded signal vector. The so obtained expanded input signal vector $s_{ext}$ is provided to an input of a first calculating unit 104, which may be integrated into the calculating unit 102 of the apparatus 100 of FIG. 5, and which is configured to apply an inverse discrete Fourier transform, iDFT, particularly using an inverse fast Fourier transform, iFFT, to said expanded signal vector $s_{ext}$, to obtain a first time domain vector $x_{short}$ at the output of the first calculating unit 104.

After that, said first time domain vector $x_{short}$ is expanded by adding one or more additional vector elements, preferably in front of and/or after the components of said first time domain vector $x_{short}$, to obtain a second time domain vector $x_{ext}$. According to the present embodiment depicted by FIG. 6, a plurality of vector elements with zero value are added to the first time domain vector $x_{short}$. According to an embodiment, said step of expanding said first time domain vector $x_{short}$ may be performed in accordance with the following equation:

$$x_{ext} = [x_{short}, \vec{0}_{[1 \times K_T]}]^T \qquad \text{(equation 5)},$$

wherein $\vec{0}_{[1 \times K_T]}$ is a Null vector with $K_T$ many elements, wherein $[\ ]^T$ denotes a vector transpose, and wherein $x_{ext}$ is the resulting second time domain vector. The expansion according to equation 5 is symbolized in FIG. 6 by bracket 105. In addition to the parameter $K_F$ of equation 2a above, the parameter $K_T$ of equation 5 represents a further degree of freedom for optimizing the method according to the embodiments regarding precision/approximation errors and efficiency.

The second time domain vector $x_{ext}$ is provided to an input of a second calculating unit 106, which may also be integrated into the calculating unit 102 of the apparatus 100 of FIG. 5, and which is configured to apply 2206 (FIG. 4) a discrete Fourier transform, DFT, particularly using a fast Fourier transform, FFT, to said second time domain vector $x_{ext}$ to obtain an upsampled signal vector $s_{up}$. The upsampled signal vector $s_{up}$ is similar to the input signal vector $s_{ik}$ in that it also constitutes a frequency domain representation associated with the desired multi carrier modulated signal mcs to be generated by the apparatus 100. However, the upsampled signal vector $s_{up}$ comprises more vector elements, i.e. spectral coefficients, than the input signal vector $s_{ik}$.

According to the present example, the upsampled signal vector $s_{up}$ is filtered, cf. bracket 108, whereby a filtered sub-band output signal $x_{filt}$ is obtained. Advantageously, according to the present embodiment, the filtering (also cf. step 230 of FIG. 3) is carried out in the frequency domain and thus avoids the high-complexity convolutional filtering in the time domain as provided by the conventional architecture 1000 (FIG. 1).

According to a further embodiment, said step of filtering 230 may also comprise evaluating the Hadamard product (i.e., element-wise product) of said upsampled signal vector $s_{up}$ and a filtering vector $F_{cut}$. This is symbolized in FIG. 6 by the arrows $F_{cut}(1), F_{cut}(2), \ldots, F_{cut}(N_{FFTu}-1), F_{cut}(N_{FFTu})$, said arrows $F_{cut}(1), F_{cut}(2), \ldots, F_{cut}(N_{FFTu}-1), F_{cut}(N_{FFTu})$ representing cut-out frequency responses of the filter for the respective spectral component, i.e. vector element, of the upsampled signal vector $s_{up}$.

According to an embodiment, in order to obtain the filtering vector $F_{cut}$, time-domain low-pass prototype filter coefficients f may be provided.

According to a further embodiment, the filter may be centered onto an even number of subcarriers sc (FIG. 2), which may be achieved by shifting the time-domain low-pass prototype filter coefficients f by half a subcarrier in frequency. For example, the shift vector $\vec{\xi}$ used for said shifting consists of elements $$\xi_k = \exp(-j\pi(k-1) \cdot N) \qquad \text{(equation 7)}$$

According to a further embodiment, a shifted filter obtained by using the shift vector $\vec{\xi}$ of equation 7 may be padded with zeros thus conditioning said shifted filter for a 2N-point-FFT:

$$F_{os} = \text{FFT}\{[\vec{\xi} \odot f)^T, \vec{0}_{[1 \times N_{OS}N-L]}]^T\} \qquad \text{(equation 8)},$$

wherein N is the number of FFT points applied in the FFT according to equation 7, wherein $N_{OS}$ is the oversampling factor according to equation 6 for determining the degree of upsampling in the upsampling stage 104, 106, also cf. step 220 of FIG. 3, and wherein "$\odot$" denotes the Hadamard product (element-wise product).

According to an embodiment, the filtering vector $F_{cut}$ with its components $F_{cut}(1), F_{cut}(2), \ldots, F_{cut}(N_{FFTu}-1), F_{cut}(N_{FFTu})$ is an appropriate cut-out for the "small" IFFT size $N_{IFFTo}$. Note that the cut-off of frequency domain filter parts may be one source of the approximation error.

According to a further embodiment, a plurality of input signal vectors $s_1, \ldots, s_B$ is received, wherein each of the input signal vectors $s_1, \ldots, s_B$ is associated with a sub-band sb1, ..., sb6 (for example, B=6 is considered, cf. FIG. 2), and wherein said steps of expanding 210, upsampling 220 and filtering 230 (cf. FIG. 3) are performed for each of said input signal vectors $s_1, \ldots, s_B$ or its associated sub-band sb1, ..., sb6 respectively. In other words, the processing block 110 of FIG. 6 may be evaluated for all input signal vectors $s_1, \ldots, s_B$ respectively.

Also, according to an embodiment, for each of said input signal vectors $s_1, \ldots, s_B$ the upsampling technique of the embodiment according to FIG. 4, comprising steps 2202, 2204, 2206, may be employed.

When processing the plurality of input signal vectors $s_1, \ldots, s_B$ as explained above, with, for example, B=6, a corresponding plurality of filtered sub-band output signals $x_{filt}$ is obtained, according to the present example six filtered sub-band output signals $x_{filt}$, wherein each one corresponds to one of said plurality of input signal vectors $s_1, \ldots, s_B$. The so obtained plurality of filtered sub-band output signals $x_{filt}$ may be combined with each other, whereby a multi-carrier modulated signal with different sub-bands is obtained.

According to a further embodiment, a filtered sub-band output signal $x_{filt}$, cf. FIG. 6, may be placed at its respective frequency position in the large $N_{OS}N$-point FFT, the respective frequency position corresponding to a specific sub-band. Its index offset may be determined as $$K_{offs} = N_{OS} \cdot (k_{alloc} - K_E) \quad \text{(equation 9)}$$

when the sub-band symbol vector position starts at index $k_{alloc}$ out of N subcarrier positions. For simplicity of notation, the sub-band index i has been omitted so far. This index is now reintroduced, writing a large FFT contribution of the i-th sub-band as $$X_{full}^{(i)} = [\vec{0}_{[1 \times K_{offs}]}, X_{filt}^T, \vec{0}_{[1 \times (N_{OS} - K_{offs} - N_{FFTu})]}]^T \quad \text{(equation 10)}.$$

Note that this expression here is written for $K_{offs} \geq 0$. According to a further embodiment, for $K_{offs} < 0$ the negative spectral contributions may be wrapped around in the FFT, exploiting the periodicity of the FFT operation. The oversampled frequency domain UF-OFDM signal obtained according to the present embodiment is a superposition of all B sub-bands $$X_{total} = \sum_{i=1}^{B} X_{full}^{(i)} \quad \text{(equation 11)},$$

in the form of the frequency domain result vector $X_{total}$ wherein, according to a further embodiment, $N_{OS} \cdot N$ many time domain samples by the IFFT $$x_{total} = \sqrt{N} \cdot \text{IFFT}\{X_{total}\} \quad \text{(equation 12)}$$

are obtained in the form of the time domain result vector $x_{total}$.

According to a further embodiment, as a UF-OFDM multi-carrier symbol as attained with the conventional system of FIG. 1 consists of only $N+L-1<2N$ samples (with L for example being a filter length as used by a conventional system having the system bandwidth N, according to an embodiment), the time domain sample vector $x_{total}$ as obtained by equation 12 may be cut (i.e., reduced) to this size (N+L−1), which does not significantly reduce precision as only within the first (N+L−1) many vector elements or samples, respectively, relevant symbol contributions to the desired UF-OFDM signal are contained.

According to an embodiment, generally, said time domain result vector $x_{total}$ is reduced to its first t many vector elements, wherein preferably t=N+L−1 as mentioned above. Other values for parameter t are also possible.

According to an embodiment, as a result of reducing said time domain result vector $x_{total}$, a reduced time domain result vector $$x_{total,r} = [x_{total}(1), x_{total}(2), \ldots, x_{total}(t)]^T \quad \text{(equation 13)}$$

is obtained. The reduction leads to a further approximation error. However, it also reduces the amount of data required for representing the time domain result vector.

According to an embodiment, if a plurality of sub-bands are considered for providing a multi carrier modulated signal, e.g. a UF-OFDM signal, processing block 110 of FIG. 6 may be evaluated for each input signal vector associated with a respective sub-band. According to a further embodiment, the so obtained filtered multi carrier modulated signals of the various sub-bands may be combined to a single multi carrier modulated signal having various sub-bands, e.g. in accordance with equations 9 to 11 as explained above. According to an embodiment, a time domain representation of said single multi carrier modulated signal having various sub-bands may be obtained e.g. in accordance with equations 12, 13.

The principle according to the embodiments advantageously enables to efficiently provide multi-carrier modulated signals of the UF-OFDM (or UFMC) type or approximations for multi-carrier modulated signals of the UF-OFDM type with comparative low or even negligible errors, respectively. The principle according to the embodiments advantageously enables a particularly efficient hardware implementation for an UF-OFDM modulator comprising e.g. apparatus 100, which is capable of processing one or more sub-bands, wherein also fragmented, i.e. non-contiguous, sub-bands are possible. Advantageously, the complexity order of the UF-OFDM modulator according to the embodiments is identical to CP (cyclic prefix)-OFDM and more than one order of magnitude less complex than conventional transmitters 1000 (FIG. 1) for UF-OFDM. In addition, variants of the apparatus according to the embodiments may also be used to provide other types of multi carrier modulated output signals, which are e.g. not at least approximately identical to such signals as obtained by the system 1000.

According to a further embodiment, for said step of applying 2206 (FIG. 4) said DFT to said second time domain vector $x_{ext}$, $N_{FFTu}$ many points are used, wherein $N_{FFTu}$ is chosen to be smaller than a system bandwidth sb, wherein said system bandwidth sb is defined in accordance with the equation sb=Bmax·$n_i$, wherein Bmax is the number of sub-bands of said multi-carrier modulated signal, and wherein $n_i$ is the number of subcarriers per sub-band. For example, if a system with $n_i$=12 subcarriers per sub-band is considered (e.g., similar to conventional LTE systems with 12 subcarriers per resource block), which comprises Bmax=6 sub-bands as exemplarily depicted by FIG. 2, said system bandwidth—in terms of subcarriers—yields sb=72. Advantageously, according to an embodiment, the parameter $N_{FFTu}$ is chosen to be smaller than said system bandwidth, whereby reduced complexity for the signal processing, particularly for the upsampling and filtering steps 220, 230 (FIG. 3), is obtained.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A method of providing a multi-carrier modulated signal which comprises at least one sub-band, wherein said sub-band comprises a plurality of subcarriers, said method comprising:
receiving an input signal vector, wherein each component of said input signal vector is associated with one of said plurality of subcarriers,
expanding said input signal vector by adding one or more additional vector elements at least one of in front of or after the components of said input signal vector, whereby an expanded signal vector is obtained,
upsampling the expanded signal vector, whereby an upsampled signal vector is obtained, and
filtering the upsampled signal vector to obtain a filtered sub-band output signal;
wherein said upsampling comprises:
applying an inverse discrete Fourier transform (iDFT) using an inverse fast Fourier transform (iFFT) to said expanded signal vector, whereby a first time domain vector is obtained,
expanding said first time domain vector by adding at least one additional vector element at least one of in front of or after the components of said first time domain vector, whereby a second time domain vector is obtained, and
applying a discrete Fourier transform (DFT) using a fast Fourier transform (FFT) to said second time domain vector, whereby said upsampled signal vector is obtained; and
wherein for said applying said DFT to said second time domain vector, $N_{FFTu}$ many points are used, wherein $N_{FFTu}$ is chosen to be smaller than a system bandwidth sb, wherein said system bandwidth sb is defined in accordance with the equation $sb=Bmax \cdot n_i$, wherein Bmax is the number of sub-bands of said multi-carrier modulated signal, and wherein $n_i$ is the number of subcarriers per sub-band.

2. The method according to claim 1, wherein for said applying said iDFT to said expanded signal vector, $N_{IFTo}$ many points are used, wherein $N_{IFTo}$ is chosen to be ≥16.

3. The method according to claim 2, wherein for said applying said DFT to said second time domain vector, $N_{FFTu}$ many points are used, wherein $N_{FFTu}$ is chosen to be $\geq 1.2 \cdot N_{IFTo}$.

4. The method according to claim 3, wherein said filtering comprises:
filtering the upsampled signal vector in the frequency domain by evaluating the Hadamard product of said upsampled signal vector and a filtering vector.

5. The method according to claim 4, wherein a plurality of input signal vectors is received, wherein each of the input signal vectors is associated with a sub-band, and wherein said expanding, upsampling and filtering are performed for each of said input signal vectors or its associated sub-band respectively.

6. The method according to claim 5, wherein filtered sub-band output signals of different sub-bands of all sub-bands are combined with each other.

7. The method according to claim 6, wherein, for all sub-bands of said multi-carrier modulated signal, a respective filtered sub-band output signal is placed at a respective frequency position in a frequency domain result vector $X_{total}$, the respective frequency position corresponding to a specific sub-band, wherein said frequency domain result vector $X_{total}$ is obtained in accordance with the equations $X_{total}=\sum_{i=1}^{B} X_{full}^{(i)}$, wherein B represents the number of sub-bands of said multi-carrier modulated signal, and wherein $X_{full}^{(i)}=[\vec{0}_{[1 \times K_{offs}]}, X_{filt}^{T}, \vec{0}_{[1 \times (N_{OS}N-K_{offs}-N_{FFTu})]}]^T$ is a frequency domain contribution of the i-th filtered sub-band output signal, wherein N is a parameter having a value ≥a system bandwidth $sb=B \cdot n_i$, and wherein $n_i$ is the number of subcarriers per sub-band, wherein $K_{offs}$ denotes said frequency position of said respective filtered sub-band output signal in said frequency domain result vector $X_{total}$.

8. The method according to claim 7, wherein a time domain result vector $x_{total}$ is obtained by applying an inverse DFT to said frequency domain result vector $X_{total}$.

9. The method according to claim 8, wherein said time domain result vector $x_{total}$ is reduced to its first t many vector elements.

10. An apparatus configured to perform the method according to claim 1.

11. An apparatus configured to perform the method according to claim 2.

12. The method according to claim 1, wherein for said applying said iDFT to said expanded signal vector, $N_{IFTo}$ many points are used, wherein $N_{IFTo}$ is chosen to be ≥64.

13. The method according to claim 2, wherein for said applying DFT to said second time domain vector, $N_{FFTu}$ many points are used, wherein $N_{FFTu}$ is chosen to be $\geq 2.0 \cdot N_{IFTo}$.

14. The method according to claim 7, wherein a time domain result vector $X_{total}$ is obtained by applying an inverse DFT to said frequency domain result vector $X_{total}$, in accordance with the equation $x_{total}=\sqrt{N} \cdot IFFT\{X_{total}\}$.

15. The method according to claim 8, wherein said time domain result vector $x_{total}$ is reduced to its first t many vector elements, wherein $t=N+L-1$.

16. An apparatus for providing a multi-carrier modulated signal which comprises at least one sub-band, wherein said sub-band comprises a plurality of subcarriers, said apparatus comprising:
at least one processor; and
at least one memory including computer program code;
the at least one memory and the computer program code configured to, when executed with the at least one processor, cause the apparatus at least to:
receive an input signal vector, wherein each component of said input signal vector is associated with one of said plurality of subcarriers,
expand said input signal vector by adding one or more additional vector elements at least one of in front of or after the components of said input signal vector, whereby an expanded signal vector is obtained,
upsample the expanded signal vector, whereby an upsampled signal vector is obtained,
filter the upsampled signal vector to obtain a filtered sub-band output signal,
apply, by means of a first calculating unit, an inverse discrete Fourier transform, (iDFT), using an inverse fast Fourier transform, (iFFT), to said expanded signal vector, to obtain a first time domain vector,
expand said first time domain vector by adding at least one additional vector element, at least one of in front of or after the components of said first time domain vector, to obtain a second time domain vector, and
apply, by means of a second calculating unit, a discrete Fourier transform (DFT), using a fast Fourier transform, FFT (FFT), to said second time domain vector, to obtain said upsampled signal vector,
wherein to apply said DFT to said second time domain vector, $N_{FFTu}$ many points are used, wherein $N_{FFTu}$ is chosen to be smaller than a system bandwidth sb, wherein said system bandwidth sb is defined in accordance with the equation $sb=Bmax \cdot n_i$, wherein Bmax is the number of sub-bands of said multi-carrier modulated signal, and wherein $n_i$ is the number of subcarriers per sub-band.

17. A mobile terminal for a communications network, wherein said mobile terminal comprises at least one apparatus according to claim 16.

* * * * *